US009067692B2

(12) United States Patent
Karasek

(10) Patent No.: US 9,067,692 B2
(45) Date of Patent: Jun. 30, 2015

(54) PIVOTABLE CANOPY ROOF OF AN AIR PASSENGER STAIR OR AN AIR PASSENGER BRIDGE

(71) Applicant: Hübner GmbH & Co. KG, Kassel (DE)

(72) Inventor: Jens Karasek, Kaufungen (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 14/281,044

(22) Filed: May 19, 2014

(65) Prior Publication Data

US 2014/0338138 A1    Nov. 20, 2014

(30) Foreign Application Priority Data

May 18, 2013  (EP) ..................................... 13002635

(51) Int. Cl.
*B64F 1/305*    (2006.01)
(52) U.S. Cl.
CPC .................................... *B64F 1/3055* (2013.01)
(58) Field of Classification Search
CPC ............................................... B64F 1/30–1/32
USPC .................................................. 14/69.5–7.52
See application file for complete search history.

(56) References Cited

U.S. PATENT DOCUMENTS

| | | | | | |
|---|---|---|---|---|---|
| 3,639,934 | A | * | 2/1972 | Eggert, Jr. ....................... | 14/71.5 |
| 3,644,952 | A | * | 2/1972 | Hatch .............................. | 14/71.5 |
| 3,693,204 | A | * | 9/1972 | Eggert, Jr. ....................... | 14/71.5 |
| 3,703,737 | A | * | 11/1972 | Eggert, Jr. ....................... | 14/71.5 |
| 3,711,881 | A | * | 1/1973 | Chapman et al. ............... | 14/71.5 |
| 3,816,867 | A | * | 6/1974 | Shirzad et al. .................. | 14/71.5 |
| 4,120,067 | A | * | 10/1978 | Hone et al. ..................... | 14/71.5 |
| 4,333,195 | A | * | 6/1982 | Lichti ............................. | 14/71.5 |
| 7,269,871 | B2 | * | 9/2007 | Koch et al. ..................... | 14/71.5 |
| 7,690,065 | B2 | | 4/2010 | Muller et al. | |
| 2009/0223005 | A1 | * | 9/2009 | Motohashi et al. ............ | 14/72.5 |

FOREIGN PATENT DOCUMENTS

WO    WO-2013050839 A1    4/2013

* cited by examiner

*Primary Examiner* — Raymond W Addie
(74) *Attorney, Agent, or Firm* — Gifford, Krass, Sprinkle, Anderson & Citkowski, P.C.; Douglas L. Wathen

(57) ABSTRACT

A pivotable canopy roof (1) of an air passenger stair or an air passenger bridge, the canopy roof comprising a flexible frame (3) at its free front end, which is connected to a portal frame (2) on the air passenger stair or air passenger bridge (11) by way of two articulated arms (30, 30a) disposed next to each other in a spaced-apart relationship, wherein a bellows (5) is disposed between the flexible frame (3) and the portal frame (2), the first and second articulated arm (30, 30a) including an upper arm (31, 31a) articulately disposed on the portal frame (2) and a lower arm (35, 35a) articulately connected to the upper arm (31, 31a), wherein the lower arm (35, 35a) comprises an end member (36, 36a), the end member (36) of the at least one articulated arm (30) being adapted to be pivoted laterally by way of a pivot joint (37).

26 Claims, 5 Drawing Sheets

PIVOTABLE CANOPY ROOF OF AN AIR PASSENGER STAIR OR AN AIR PASSENGER BRIDGE

CROSS REFERENCE TO RELATED APPLICATIONS

This application claims priority of European Patent Application No. EP 13 002 635.4, filed May 18, 2013, the content of which is incorporated herein in its entirety.

FIELD OF THE INVENTION

The invention relates to a pivotable canopy roof of an air passenger stair or an air passenger bridge, the canopy roof having a flexible frame on its front free end, which is connected to the portal frame of the air passenger stair or air passenger bridge by way of two articulated arms disposed in a spaced-apart relationship and next to each other. A bellows is disposed between the flexible frame and the portal frame. Each articulated arm includes an upper arm articulately disposed on the portal frame and a lower arm articulately connected to the upper arm, the lower arm comprising an end member, more specifically angled relative to the lower arm.

BACKGROUND OF THE INVENTION

A pivotable canopy roof of an air passenger stair or an air passenger bridge of the type mentioned in the introduction is known from DE 10 2004 016 272 B4. The design of this canopy roof has proven of great value and is often used. However, it has turned out that with strongly contoured aircraft fuselages, and here more specifically in the area of the bow side boarding access, the flexible frame with which the canopy roof rests on the outside skin of the aircraft fuselage not always rests flush with the aircraft hull on the bow side, i.e. toward the front end of the aircraft. On the one hand, this can be due to the fact that, as has already been explained, the aircraft fuselage is strongly contoured in that access area, or that more specifically with large canopy roofs, the inherent elasticity of the canopy roof and here more specifically of the articulated arms is minimal due to the stiff design of the articulated arms. This means that the deformation is not sufficient to ensure a full contact of the flexible frame with the bumper.

In order to always ensure a circumferential contact of the flexible frame on the outer skin of the aircraft fuselage, it is proposed according to the invention that the end member of the at least one first articulated arm is pivotable laterally via a swivel joint. Here, laterally pivotable means that the end member is pivotable in the direction of the width of the flexible frame, more specifically in the direction of the interior of the canopy roof. This means that when the flexible frame of the pivotable canopy roof comes to rest on the outer skin of the aircraft, at the moment in which the flexible frame comes in contact with the outer skin in the area of the end member, the end member of the at least one first articulated arm is pivoted slightly inward, and thus ensures full contact of the flexible frame on the outer skin of the aircraft. By pivoting the end member inward, it is ensured that the canopy roof rests on the aircraft fuselage substantially without tension.

Advantageous features and embodiments of the invention can be gathered from the dependent claims. In the following, the structure of the first articulated arm is described in more detail.

Thus, it is more specifically provided that in the one first articulated arm, the upper arm is connected to the lower arm by way of a hinge joint with a hinge axis that is horizontal in the mounted state, the joint axis of the pivot joint for the laterally pivotable or extendable end member running perpendicular to the hinge axis between the upper arm and the lower arm.

According to another feature of the invention, the end member is connected to the lower arm by way of an intermediate member. This means that the first articulated arm consists of a total of four elements, namely an upper arm, a lower arm connected to it in an articulated manner, to which an intermediate member is connected in turn, which is preferably angled in the direction of the pivot plane of the articulated arm relative to the lower arm, and the end member that is receivable by the intermediate member so as to be laterally pivotable around a pivot joint.

According to a particularly advantageous feature, the end member is pivotable out of the plane of the lower arm against the force of a spring. Thus it is ensured that when retracting the canopy roof, the end member and the first articulated arm always lie in one plane.

Furthermore, ensuring that the end member is laterally pivotable in only one direction, namely laterally in the direction of the interior of the canopy roof is advantageous.

The connection between the intermediate member and the end member is configured as a laterally movable connection, the intermediate member comprising a projection that is received with a lateral clearance by the end member. This means that the projection of the intermediate member is mounted in the hollow profile of the end member with a lateral clearance, in order to permit the lateral extendibility of the end member relative to the intermediate member. An elastomer block relative to which the end member is resiliently pivotable is located between the projection and the end member configured as a hollow profile. This means that the distance between the projection of the intermediate member and the interior wall of the end member determines amongst others the degree of deflection of the end member.

According to another feature of the invention, the air passenger stair or the air passenger bridge comprises an actuation device for pivoting the canopy roof, the actuation device including a pulling means at least for the one first articulated arm. A roll for the pulling means is disposed in the area of the portal frame, the pulling means being laterally articulated with the end member of the articulated arm, i.e. on the side toward which the end member does not pivot. This means that the articulation of the pulling means is eccentric. The consequence of this is that the arrangement of the pulling means on the outer side of the end member assists in the straightening of the end member.

The second articulated arm is also advantageously connected to the portal frame by way of a traction mechanism, e.g. a rope or a strap.

In particular, a roll on the portal frame for rolling up and unrolling the pulling means, i.e. for example a strap or a rope, is attributed to each pulling means, the two rolls being connected by way of a shaft to a drive, for example a tubular motor.

In order to initiate the extension movement of the articulated arms, the actuation device includes at least one driving member for the at least one first articulated arm, which is more specifically configured as a gas pressure spring.

In the following, the invention is exemplarily described in more detail based on the drawings.

DETAILED DESCRIPTION OF THE INVENTION

Figure 1:
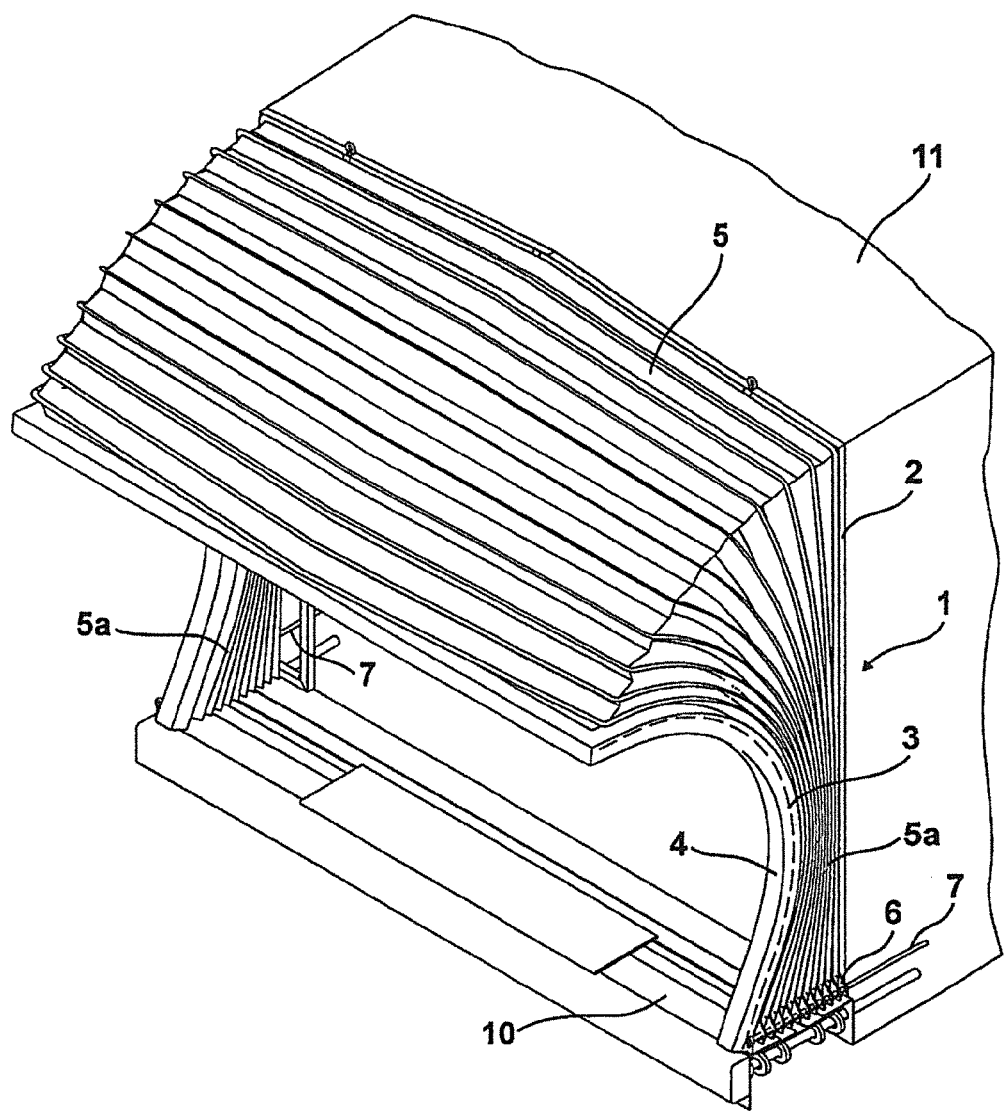
FIG. 1 is a perspective view from above of a the canopy roof of an air passenger stair or air passenger bridge.

A canopy roof 1 of an air passenger stair or air passenger bridge 11 includes a portal frame 2 and a flexible frame 3, which receives a bumper 4 made of an elastically resilient material, e.g. foam material, at its end side. The pleated bellows 5 is stretched between the portal frame on the one hand and the flexible frame 3 on the other hand. Like the flexible frame and the portal frame 2, the pleated bellows 5 has a U-shaped contour and spans the gangway floor labelled 10 as a whole. In the floor area of the two legs 5a of the bellows 5, the bellows has several bellows grommets 6 disposed behind each other, which are received by a guide rail 7. The guide rail 7 is fastened at its end to the flexible frame on the one hand and to the air passenger stair or air passenger bridge 11 itself or to the portal frame on the other hand.

Figure 2:
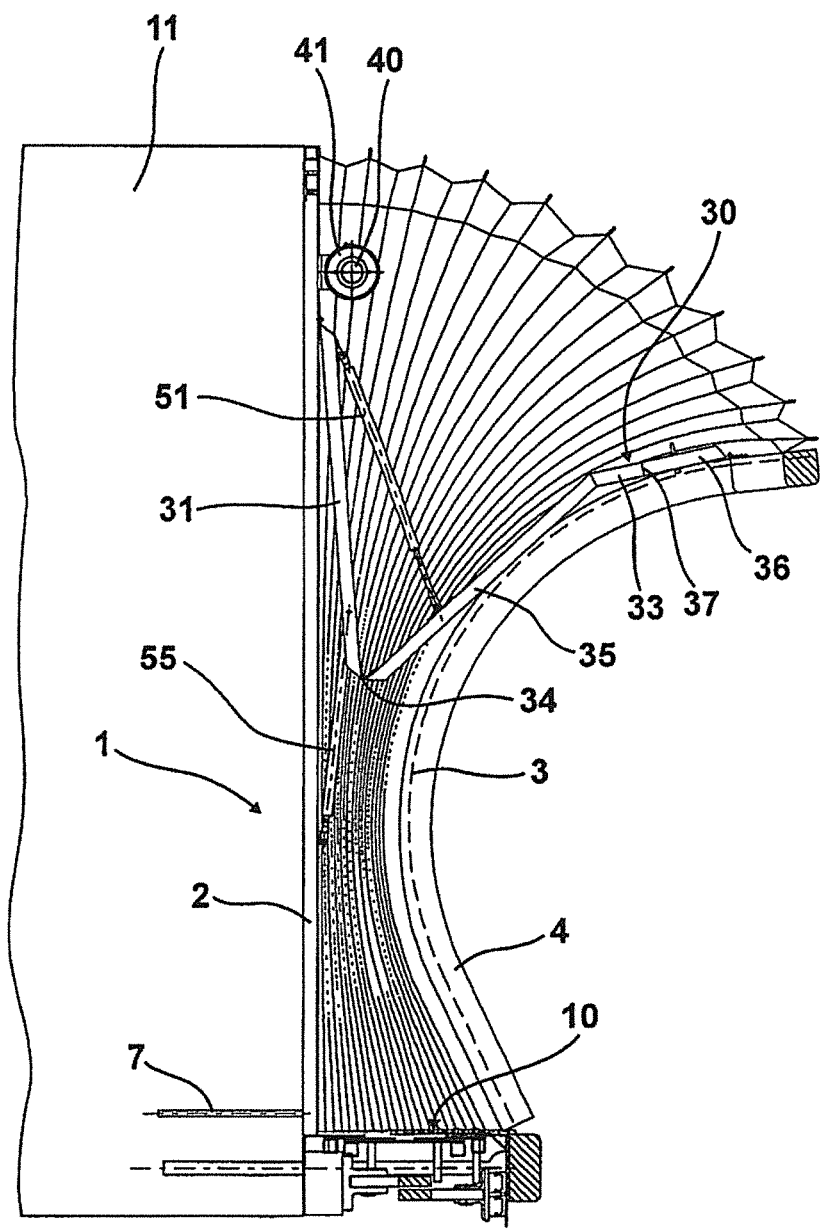
FIG. 2 is a sectional lateral view of the canopy roof according to FIG. 1.
Figure 5:
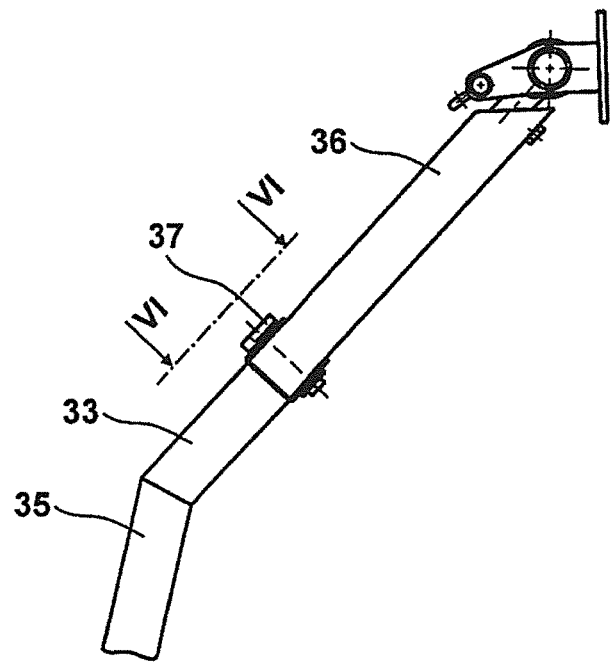
FIG. 5 is a detailed view of the area indicated at X in FIG. 4.
Figure 6:
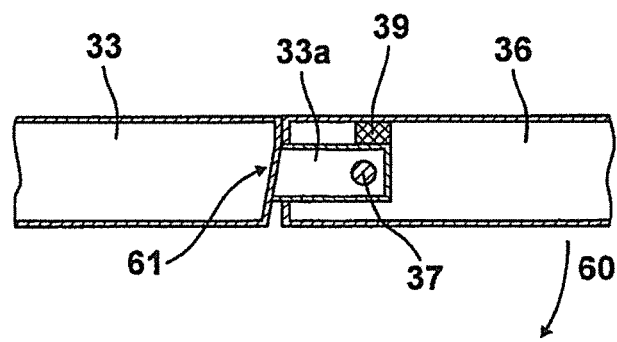
FIG. 6 is a cross sectional view taken in the direction of line VI-VI in FIG. 5.

In the representation according to FIG. 2, an actuation device 20 is visible, and includes a first articulated arm 30 and a second articulated arm 30a disposed at a distance from said first articulated arm. A roll 41, 47 for a pulling means 49 disposed on the portal frame 2 is respectively attributed to the two articulated arms 30, 30a. The two rolls 41, 47 are connected to each other by the rotatable shaft 40, which possesses a drive, e.g. in form of a tubular drive, not shown. The actuation device moreover includes respectively two drive members 51, 55, which are advantageously configured as gas pressure springs, for the first and second articulated arm 30, 30a. The articulated arm labelled 30, 30a as a whole is disposed on the portal frame in the area of each leg 5a of the pleated bellows 5 in the ceiling area of the bellows. It includes the upper arm 31, 31a articulately connected to the portal frame and the lower arm 35, 35a also connected in an articulated manner to the upper arm 31, 31a. The lower arm and the upper arm are connected to each other by way of a hinge joint 34, 34a, which has a horizontal hinge axis in the mounted state. The lower arm 35, 35a comprises an end member 36, 36a at its end, wherein the connection of the end member 36 of the first articulated arm 30 to the lower arm may be learned from the representation according to FIG. 5 and FIG. 6. The lower arm 35 features an intermediate member 33 at an angle relative to the lower arm, namely in the plane of the articulated arm 30.

An elastomer block 39 serving as a possible spring element is located between the projection 33a and the interior wall of the end member 36 configured as a hollow profile, so that the end member 36 pivots in the direction of the arrow 60 against the force of the elastomer block 39, so that the end member 36 always returns to its initial position when the canopy roof is retracted.

Figure 3:
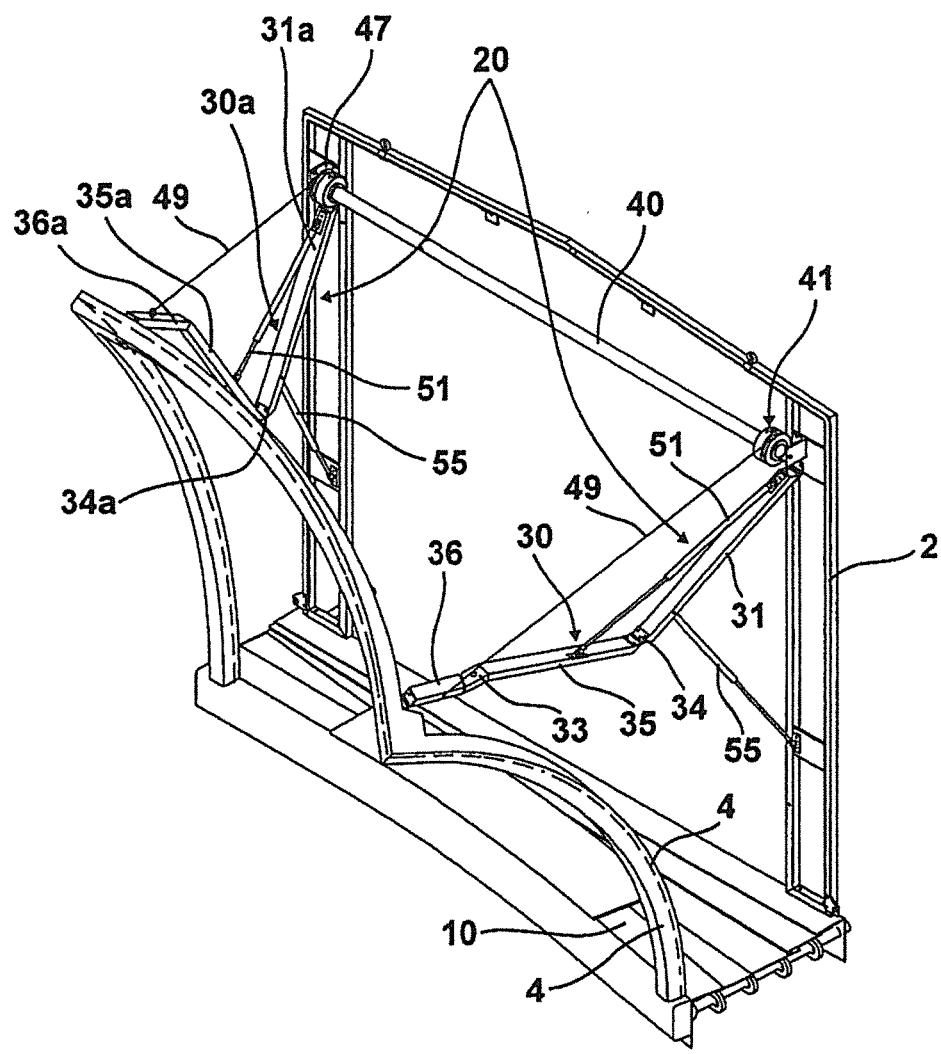
FIG. 3 is a view similar to FIG. 1, wherein the bellows has been left out.
Figure 4:
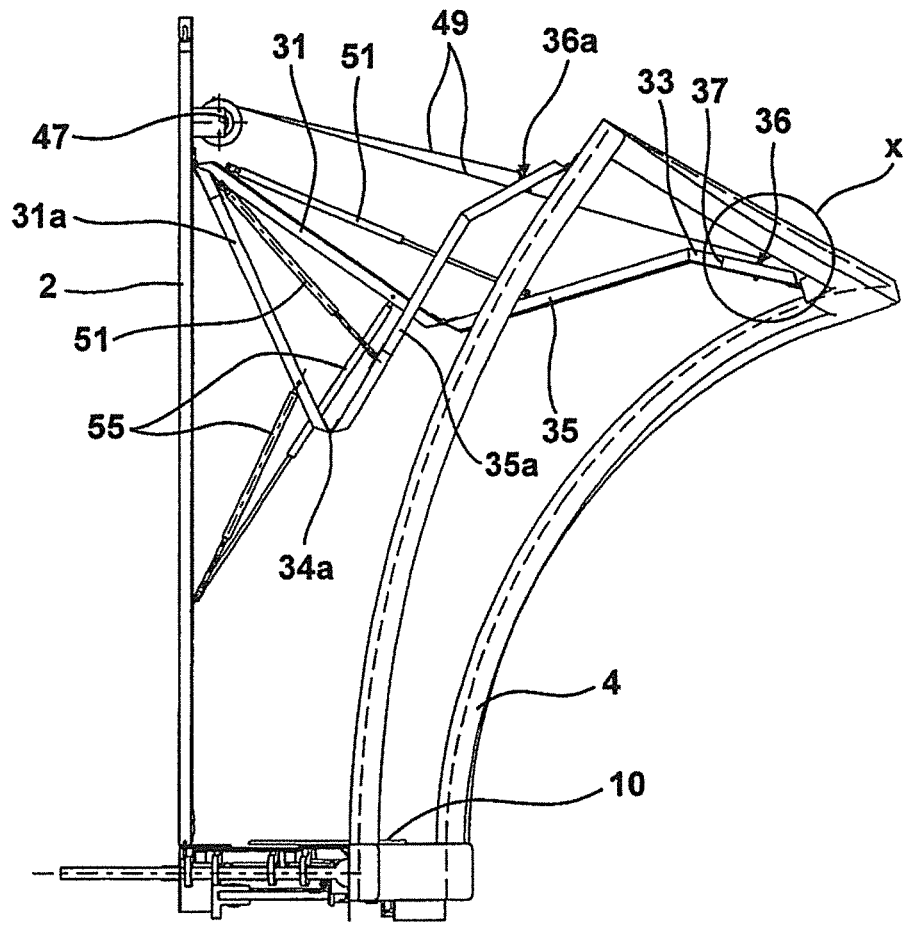
FIG. 4 is a view similar to FIG. 2 also without a bellows.

The end member 36 is connected to the roll 41 by way of a strap or a rope 49 in such a manner that the rope 49 is disposed laterally, i.e. eccentrically, on the end member, as can be seen immediately when looking at FIG. 3. At this point it must be pointed out that the opposite articulated arm 30 does not have to comprise such an articulated configuration of the end member. Rather, this is only provided for the articulated arm located in the area of the bow-side end of the aircraft, in order to ensure that the canopy roof rests on the aircraft fuselage substantially without tension.

LIST OF REFERENCE NUMBERS 1 canopy roof
2 portal frame
3 flexible frame
4 bumper
5 pleated bellows
5a leg of the pleated bellows
6 bellows grommets
7 guide rail
10 gangway floor
11 air passenger stair or bridge
20 actuation device
30 first articulated arm
30a second articulated arm
31 upper arm
31a upper arm
33 intermediate member
33a projection
34 hinge joint
34a hinge joint
35 lower arm
35a lower arm
36 end member
36a end member
37 pivot joint
39 elastomer block
40 rotatable shaft
41 roll
47 roll
49 traction means (rope, strap)
51 drive member (gas pressure spring)
55 drive member (gas pressure spring)
60 arrow
61 arrow

The invention claimed is:

1. A pivotable canopy roof for an air passenger stair or an air passenger bridge of the type having a portal frame, the canopy roof comprising:
   a flexible frame defining a front end of the pivotable canopy roof;
   a bellows disposed between the flexible frame and the portal frame;
   a first and a second articulated arm disposed in a spaced-apart relationship, the arms connecting the flexible frame to a portal frame of an air passenger stair or an air passenger bridge, each of the articulated arms having an upper arm articulately connected to the portal frame and a lower arm articulately connected to the upper arm, the lower arms each having an end member;
   wherein the end member of at least one of the articulated arms is laterally pivotable about a pivot joint and is pivotable out of a plane of the lower arm against a spring force of a spring element.

2. A canopy roof in accordance with claim 1, wherein:
   a hinge joint connects the upper arm to the lower arm of the at least one articulated arm, the hinge joint having a horizontal hinge axis; and
   the joint axis of the pivot joint being perpendicular to the hinge axis of the hinge joint.

3. A canopy roof in accordance with claim 1, wherein:
the lower arm of the at least one articulated arm further has an intermediate member, the intermediate member connecting the end member to a remainder of the lower arm.

4. A canopy roof in accordance with claim 3, wherein:
the intermediate member is angled relative to the remainder of the lower arm.

5. A canopy roof in accordance with claim 1, wherein:
the end member is laterally pivotable in only one direction.

6. A canopy roof in accordance with claim 3, wherein:
the intermediate member has a projection that is pivotably connected to the end member.

7. A canopy roof in accordance with claim 6, wherein:
an elastomer block is disposed as a spring element between the projection and an interior wall of the end member.

8. A canopy roof in accordance with claim 1, further comprising:
an actuation device for pivoting the canopy roof, the actuation device including at least one traction element, at least one roll for the at least one traction element, the roll being disposed in the area of the portal frame, the traction element being laterally articulated on the end member of the at least one articulated arm in such a manner that the end member is pulled straight when retracting the first articulated arm.

9. A canopy roof in accordance with claim 1, further comprising:
a traction element for each articulated arm, a roll for each traction element for rolling up and unrolling the traction element, each roll being disposed in the area of the portal frame, the rolls being connected to a drive by a rotatable shaft.

10. A canopy roof in accordance with claim 1, further comprising:
an actuation device including at least one drive member for the first and second articulated arm.

11. A canopy roof in accordance with claim 10, wherein:
the drive member is a gas pressure spring.

12. A pivotable canopy roof for an air passenger stair or an air passenger bridge of the type having a portal frame, the canopy roof comprising:
a flexible frame defining a front end of the pivotable canopy roof;
a bellows disposed between the flexible frame and the portal frame;
a first and a second articulated arm disposed in a spaced-apart relationship, the arms connecting the flexible frame to a portal frame of an air passenger stair or an air passenger bridge, each of the articulated arms having an upper arm articulately connected to the portal frame and a lower arm articulately connected to the upper arm, the lower arms each having an end member;
wherein the end member of at least one of the articulated arms is laterally pivotable about a pivot joint; and
an actuation device for pivoting the canopy roof, the actuation device including at least one traction element, at least one roll for the at least one traction element, the roll being disposed in the area of the portal frame, the traction element being laterally articulated on the end member of the at least one articulated arm in such a manner that the end member is pulled straight when retracting the first articulated arm.

13. A canopy roof in accordance with claim 12, wherein:
a hinge joint connects the upper arm to the lower arm of the at least one articulated arm, the hinge joint having a horizontal hinge axis; and
the joint axis of the pivot joint being perpendicular to the hinge axis of the hinge joint.

14. A canopy roof in accordance with claim 12, wherein:
the lower arm of the at least one articulated arm further has an intermediate member, the intermediate member connecting the end member to a remainder of the lower arm.

15. A canopy roof in accordance with claim 14, wherein:
the intermediate member is angled relative to the remainder of the lower arm.

16. A canopy roof in accordance with claim 12, wherein:
the intermediate member has a projection that is pivotably connected to the end member.

17. A canopy roof in accordance with claim 16, wherein:
an elastomer block is disposed as a spring element between the projection and an interior wall of the end member.

18. A canopy roof in accordance with claim 12, further comprising:
a traction element for each articulated arm, a roll for each traction element for rolling up and unrolling the traction element, each roll being disposed in the area of the portal frame, the rolls being connected to a drive by a rotatable shaft.

19. A pivotable canopy roof for an air passenger stair or an air passenger bridge of the type having a portal frame, the canopy roof comprising:
a flexible frame defining a front end of the pivotable canopy roof;
a bellows disposed between the flexible frame and the portal frame;
a first and a second articulated arm disposed in a spaced-apart relationship, the arms connecting the flexible frame to a portal frame of an air passenger stair or an air passenger bridge, each of the articulated arms having an upper arm articulately connected to the portal frame and a lower arm articulately connected to the upper arm via a hinge joint having a horizontal axis, the lower arms each having an end member;
an actuation device including at least one drive member for the first and second articulated arms, the actuation device being configured to actuate the articulated arms from a folded position into an extended position, in the folded position, the upper arm of each articulated arm extending downwardly from the portal frame and the lower arm of each articulated arm extending from the respective upper arm upwardly to the respective end member;
wherein the end member of at least one of the articulated arms is laterally pivotable about a pivot joint.

20. A canopy roof in accordance with claim 19, wherein:
the joint axis of the pivot joint being perpendicular to the hinge axis of the hinge joint.

21. A canopy roof in accordance with claim 19, wherein:
the lower arm of the at least one articulated arm further has an intermediate member, the intermediate member connecting the end member to a remainder of the lower arm.

22. A canopy roof in accordance with claim 21, wherein:
the intermediate member is angled relative to the remainder of the lower arm.

23. A canopy roof in accordance with claim 19, wherein:
the end member of the at least one articulated arm is pivotable out of a plane of the lower arm against a spring force of a spring element.

24. A canopy roof in accordance with claim 23, wherein:
the end member is laterally pivotable in only one direction.

25. A canopy roof in accordance with claim 21, wherein:
the intermediate member has a projection that is pivotably connected to the end member.

26. A canopy roof in accordance with claim 25, wherein:
an elastomer block is disposed as a spring element between the projection and an interior wall of the end member.

\* \* \* \* \*